United States Patent [19]

Yoneda et al.

[11] Patent Number: 4,615,149
[45] Date of Patent: Oct. 7, 1986

[54] FEED CONTROL APPARATUS FOR GRINDING MACHINE

[75] Inventors: Takao Yoneda, Toyoake; Yasuji Sakakibara, Hekinan, both of Japan

[73] Assignee: Toyoda Koki Kabushiki Kaisha, Kariya, Japan

[21] Appl. No.: 736,841

[22] Filed: May 22, 1985

[30] Foreign Application Priority Data

May 23, 1984 [JP] Japan ................................ 59-105386

[51] Int. Cl.$^4$ ............................................ B24B 49/02
[52] U.S. Cl. ............................ 51/165.71; 51/105 SP; 51/289 R; 51/165 TP; 364/474
[58] Field of Search .......... 51/105 R, 105 SP, 165.71, 51/165 TP, 289 R; 364/474

[56] References Cited

U.S. PATENT DOCUMENTS

| | | | |
|---|---|---|---|
| 3,634,978 | 1/1972 | Uhtenwoldt et al. | 51/165 |
| 3,897,659 | 8/1975 | Henry | 51/165.92 |
| 4,294,045 | 10/1981 | Enomoto et al. | 51/165.71 |
| 4,337,599 | 7/1982 | Koide et al. | 51/289 |

OTHER PUBLICATIONS

Japanese Unexamined Published patent application No. 57-75766, Filed: Oct. 31, 1980; Published: May 12, 1982.

*Primary Examiner*—Harold D. Whitehead
*Attorney, Agent, or Firm*—Oblon, Fisher, Spivak, McClelland & Maier

[57] ABSTRACT

A feed control apparatus for a numerically controlled grinding machine having a work table movable in a first axis direction, a wheel head provided thereon with a grinding wheel of the angular type and movable in a second axis direction perpendicular to the first axis, wherein the feed control apparatus comprises a memory for storing an instruction for effecting relative movement between the work table and the wheel head, and command data indicative of a movement amount of the wheel head in the second axis direction, a computer for reading out the stored instruction and command data to calculate a movement amount of the work table on a basis of the read out command data and for producing first and second output signals respectively indicative of the movement amount of the wheel head and the calculated movement amount of the work table, and a feed mechanism responsive to the output signals from the computer for effecting the relative movement between the work table and the wheel head to move the grinding wheel along a path extending at an acute angle with respect to the second axis.

5 Claims, 8 Drawing Figures

FEED CONTROL APPARATUS FOR GRINDING MACHINE

BACKGROUND OF THE INVENTION

The present invention relates to a numerically controlled grinding machine, and more particularly to a feed control apparatus for a grinding machine which includes a wheel head with a grinding wheel of the angular type mounted thereon.

In such a conventional grinding machine as described above, a work table is slidably mounted on a bed in a first axis direction for supporting thereon a workpiece and rotating it about the first axis, a wheel head is slidably mounted on the bed in a second axis direction perpendicular to the first axis, and a grinding wheel is rotatably mounted on the wheel head and is formed at the outer periphery thereof with first and second grinding surfaces, the first grinding surface being arranged in parallel with the first axis for grinding a cylindrical portion of the workpiece, and the second grinding surface being arranged in parallel with the second axis for grinding a shoulder portion of the workpiece adjacent to the cylindrical portion. The conventional grinding machine further comprises first and second feed mechanisms for moving the work table and the wheel head respectively in the first and second axis directions, and a numerical feed control apparatus for activating both the feed mechanisms on a basis of numerical control data and for effecting relative movement between the work table and the wheel head to move the grinding wheel along a path extending across the second axis at an acute angle. In the numerical control data for the feed control apparatus, it is necessary to store each movement amount of the work table in the first axis direction in relation to each movement amount of the wheel head in the second axis direction. In the case that the moving direction of the grinding wheel is determined at an acute angle $\theta$ with respect to the second axis direction and that movement amount of the wheel head is determined as a value r, each calculation of r tan $\theta$ is required to determine each movement amount $\Delta Z$ of the work table. For this reasons, the input work for the numerical control data becomes troublesome. In general, the value of r tan $\theta$ includes a fraction, causing an error in determination of the movement amount of the work table.

SUMMARY OF THE INVENTION

It is, therefore, a primary object of the present invention to provide an improved feed control apparatus in which only each movement amount of the wheel head is stored in the numerical control data to calculate each movement amount of the work table during operation of the apparatus and to avoid an error in calculation of the movement amount of the work table.

According to the present invention briefly summarized, the object is attained by providing a feed control apparatus which comprises memory means for storing the numerical control data, an instruction for effecting the relative movement between the work table and the wheel head, and command data indicative of each movement amount of the wheel head in the second axis direction; means for reading out the stored instruction and command data; computation means responsive to the read out instruction for calculating a movement amount of the work table on a basis of the read out command data so as to enable the grinding wheel to move along the path and for producing first and second output signals respectively indicative of the movement amount of the wheel head and the calculated movement amount of the work table; and means responsive to the output signals of the computation means for activating the feed mechanisms to effect the relative movement between the work table and the wheel head.

BRIEF DESCRIPTION OF THE DRAWINGS

The foregoing object and other objects, features and attendant advantages of the present invention will be readily appreciated as the same becomes more clear from the following detailed description, when considered with reference to the attached drawings, in which:

FIG. 7 illustrates data for the feed control of the grinding machine.

DETAILED DESCRIPTION OF THE PREFERRED EMBODIMENT

Figure 1:
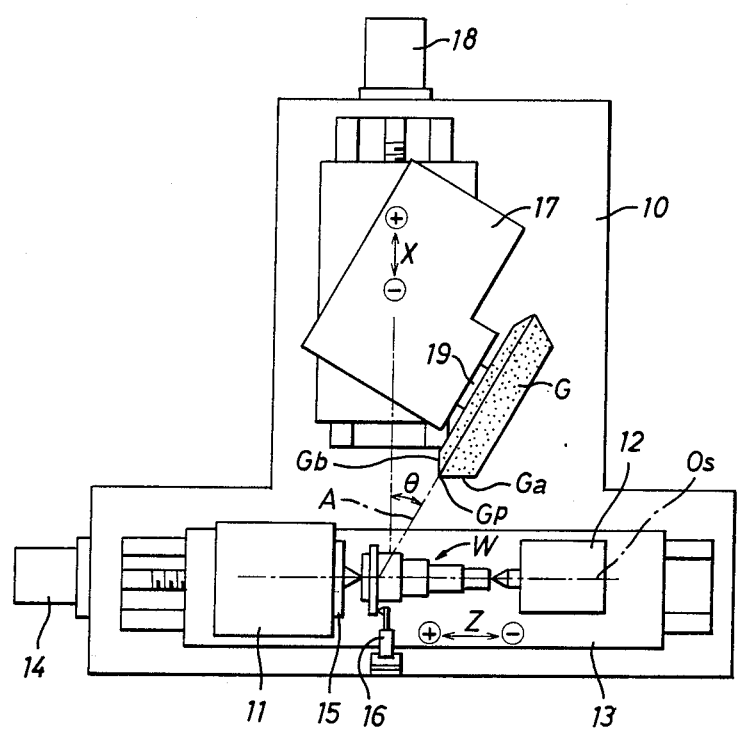
FIG. 1 is a plan view of the grinding machine.
Figure 2:
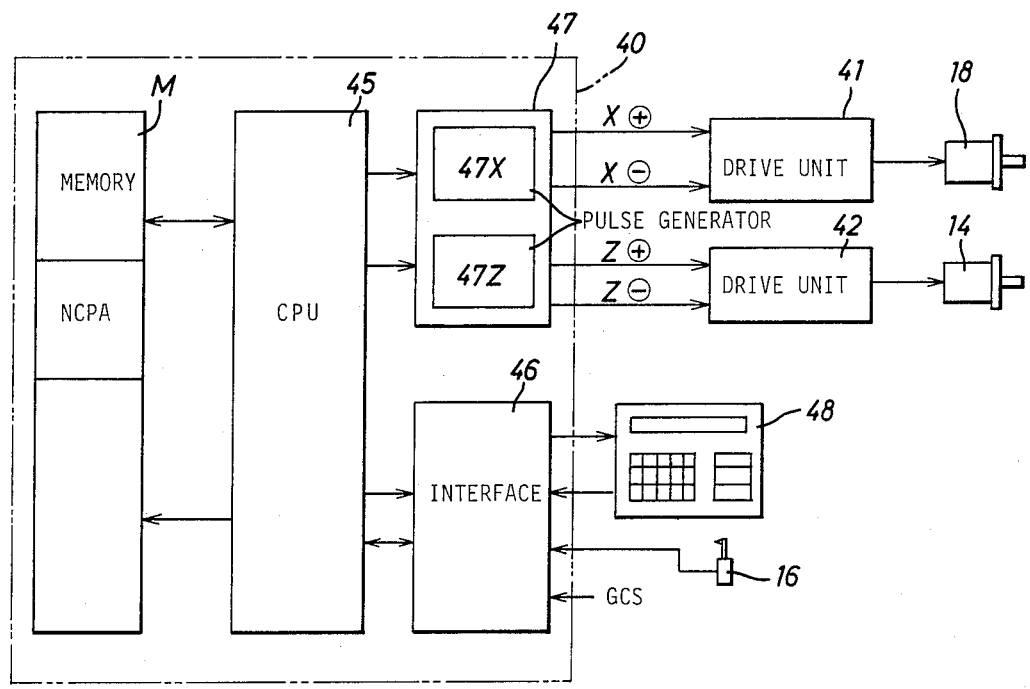
FIG. 2 is a block diagram of a feed control apparatus for the grinding machine shown in FIG. 1.

Referring now to the attached drawings, wherein like reference numerals or characters indicate identical or corresponding parts throughout the several views. In FIGS. 1 and 2 there is schematically illustrated a feed control apparatus for a numerically controlled grinding machine in accordance with the present invention. The grinding machine comprises a bed 10, and a work table 13 with a headstock 11 and a tailstock 12 mounted thereon. The work table 13 is slidable on the bed 10 through a pair of guide ways in a Z-axis or first-axis direction in parallel with an axis $O_s$ of a main shaft 15 of headstock 11. The work table 13 is threadedly engaged with a feed screw shaft which is drivingly connected to a servo motor 14. A workpiece W is rotatably supported by headstock 11 and tailstock 12 to be driven by the main shaft 15 of headstock 11 in a usual manner. Mounted on the front portion of bed 10 is a measuring head 16 which is movable toward and away from the workpiece W. When engaged with a reference end surface $W_s$ of the workpiece W, the measuring head 16 acts to indicate a position of workpiece W in the Z-axis direction. Mounted on the rear portion of bed 10 is a wheel head 17 which is movable in an X-axis or second-axis direction perpendicular to the main shaft axis $O_s$. The wheel head 17 is threadedly engaged with a feed screw shaft which is drivingly connected to a servo motor 18 through a gearing mechanism (not shown). A grinding wheel G of the angular type is mounted on the wheel head 17 by means of a shaft 19 and operatively connected to a drive motor (not shown) in a usual manner. The grinding wheel G is formed at its outer periphery with a first grinding surface $G_a$ in parallel with the main shaft axis $O_s$, a second grinding surface $G_b$ perpendicular to the former surface, and an apex portion $G_p$ positioned on a path A extending at an acute angle $\theta$ with respect to the X-axis.

FIG. 2 illustrates a feed control apparatus 40 for the grinding machine which includes a central data processing unit or CPU 45, a memory M, an interface 46, and a pulse generating circuit 47. The feed control apparatus 40 acts to effect pulse distribution to drive units 41 and 42 for control of the grinding processes of workpiece W, as will be described in detail later. The interface 46 is connected to a data input device 48 and to the measuring head 16. The pulse generating circuit 47 includes a pair of pluse generators 47X and 47Z which are arranged to simultaneously apply the pulses to the drive units 41 and 42 at a command speed. The memory M stores therein a program illustrated by respective flow charts of FIGS. 6 and 7 and is further provided therein with a numerical control data area or NCDA in which predetermined data for grinding processes of the workpiece W are written and stored by means of the data input device 48, for example, as is illustrated in FIG. 7. The CPU 45 is arranged to execute the program in accordance with the predetermined data as described in detail below.

Figure 3:
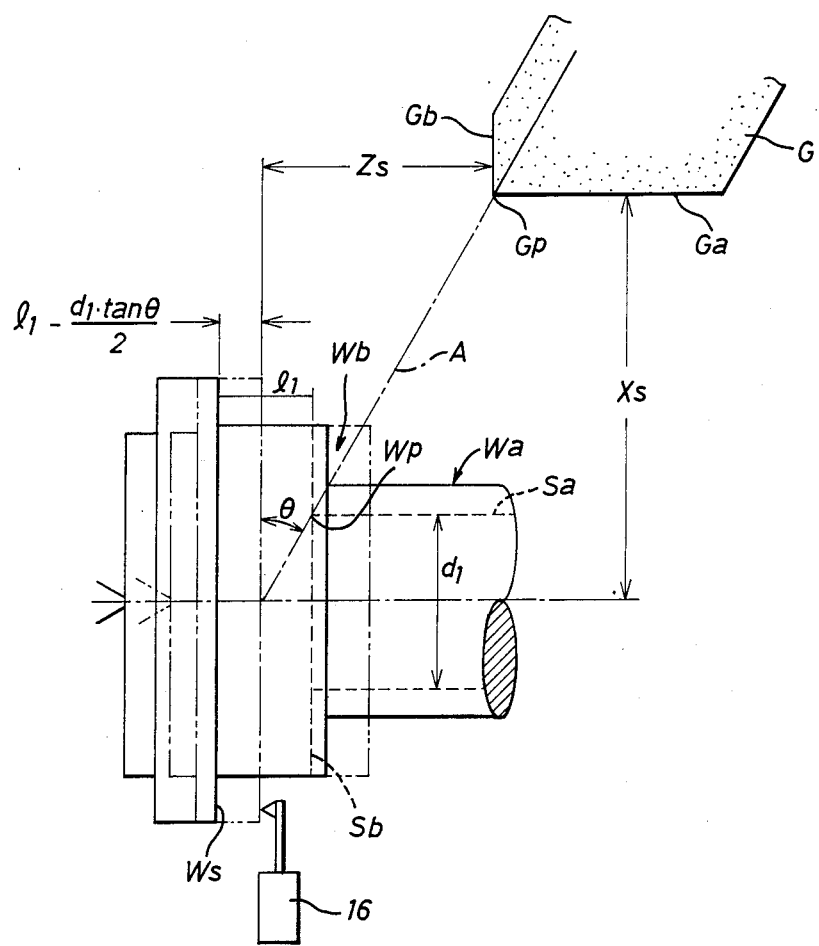
FIG. 3 illustrates relative positions between a grinding wheel and a workpiece.
Figure 5:
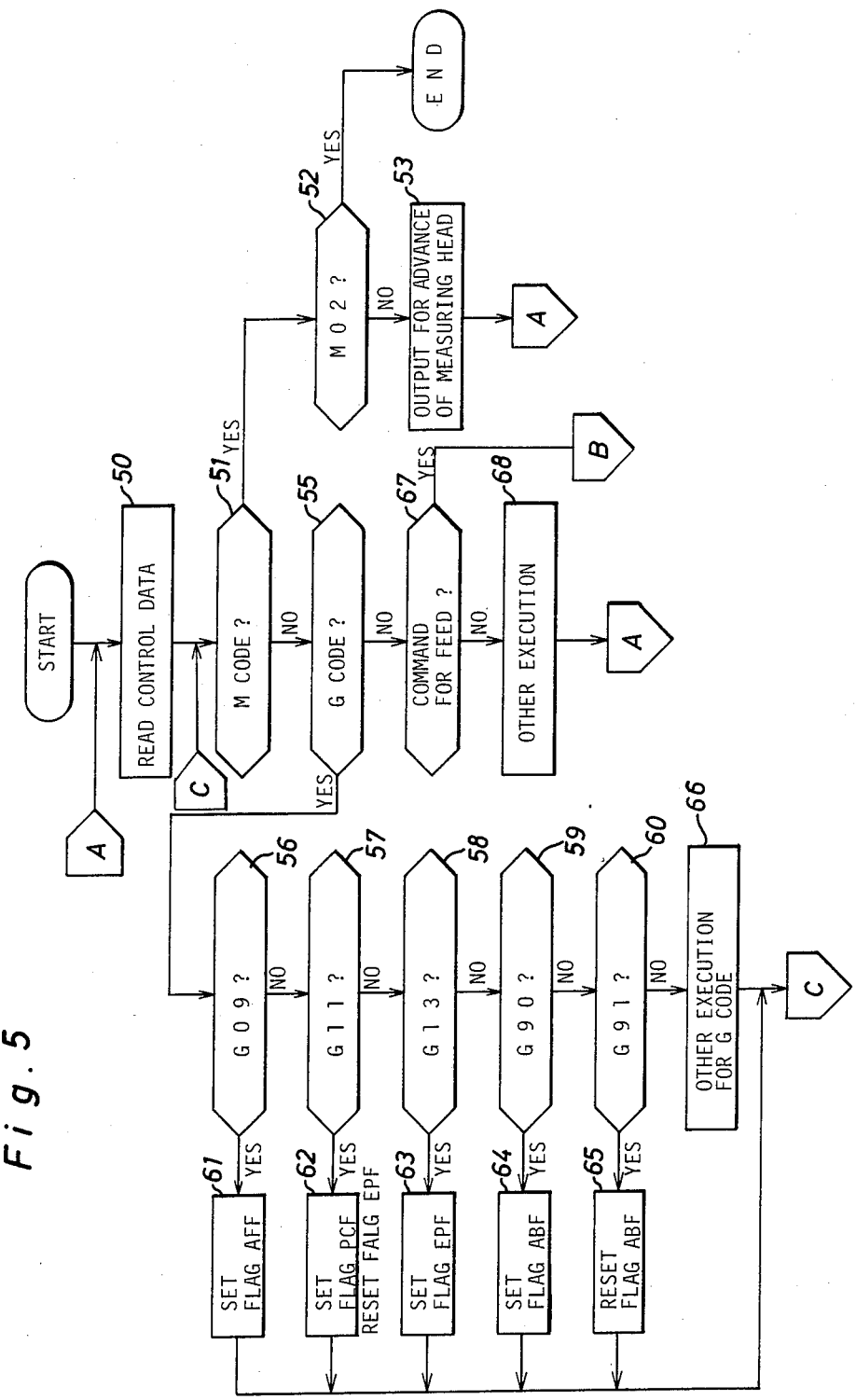
FIGS. 5 and 6 are flow charts showing a program to be executed by a central data processing unit in FIG. 2.
Figure 6:
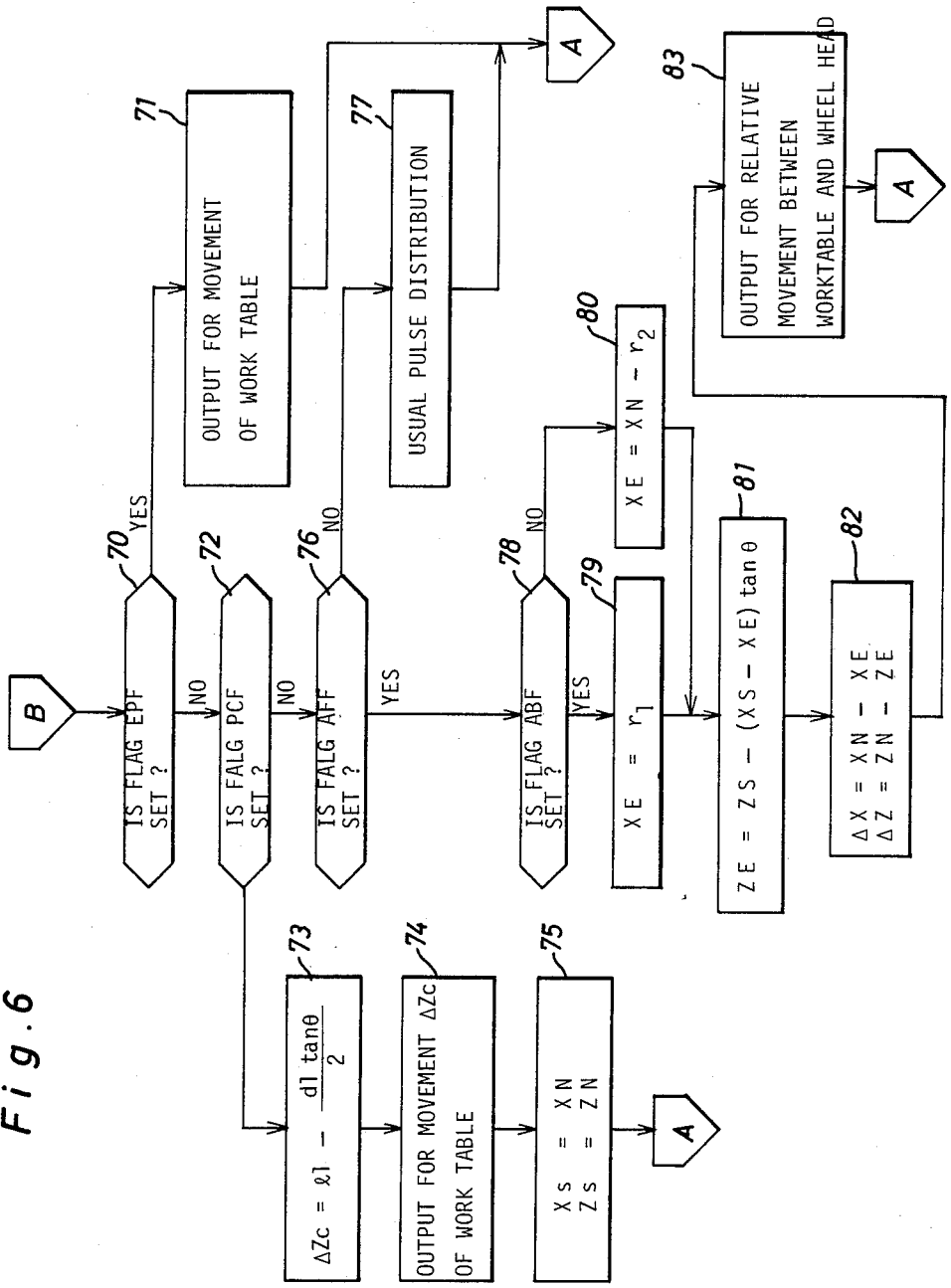

The operation of the CPU 45 will be described with reference to the flow charts of FIGS. 5 and 6. When the feed control apparatus 40 is applied with a start command signal GCS for grinding the workpiece W in a condition where the work table 13 is being positioned to support the workpiece W as shown in FIGS. 1 and 3, the CPU 45 reads out the first data N001 from the memory M at a step 50 in FIG. 5. When the program proceeds to a step 51, the CPU 45 determines as to presence of a M-code. In this instance, the answer is "Yes" because of presence of a code M40 in the first data, and the program proceeds to a step 52 where the CPU 45 determines as to presence of a code M02. When the answer is "No" because of no presence of the code M02, the program proceeds to a step 53 where the CPU 45 produces an output signal for advance of the measuring head 16 toward the workpiece W. Thus, the measuring head 16 is advanced in a usual manner to be brought into engagement with the reference end surface $W_s$ of workpiece W. Subsequently, the program returs to step 50 where the CPU 45 reads out a second data N002 from the memory M. When the answer at step 51 is "No" because of no presence of the M-code, the program proceeds to a step 55 where the CPU 45 determines as to presence of a G-code. In this instance, the answer is "Yes" because of presence of a code G13 in the second data, and the program proceeds through steps 56 and 57 to a step 58 where the CPU 45 determines the answer as "Yes" and causes the program to proceed to a step 63. At step 63, the CPU 45 acts to set an end surface positioning flag EPF and causes the program to proceed to a step 67 through steps 51 and 55. At step 67, the CPU 45 determines the answer as "Yes" and causes the program to proceed to a step 70 in the flow chart of FIG. 6.

At step 70, the CPU 45 determines the answer as "Yes" because of presence of the flag EPF and causes the program to proceed to a step 71. At step 71, the CPU 45 produces an output signal therefrom for rightward movement of the work table 13, and the pulse generator 47Z in circuit 47 produces pulses therefrom in response to the output signal from the CPU 45 to distribute them to the drive unit 42. Thus, the drive unit 42 is activated by the pulses applied thereto to operate the servo motor 14 for effecting the rightward movement of the work table 13 as is illustrated by imaginary lines in FIG. 3. When engaged with the reference end surface $W_s$ of workpiece W, the measuring head 16 produces an output signal therefrom, in response to which the CPU 45 causes the pulse generator 47Z deactivate to deenergize the drive unit 42 and the servo motor 14. Thus, the workpiece W is located in a reference position.

When the program returns to step 50 after completion of the pulse distribution to the drive unit 42, the CPU 45 reads out a third data N003 from memory M to determine as to presence of the M-code at step 51. In this instance, the answer is "Yes" because of presence of a code M41 in the third data, and the program proceeds through step 52 to step 53 where the CPU 45 produces an output signal for retraction of the measuring head 16 from the workpiece W. Thus, the measuring head 16 is retracted in response to the output signal from the CPU 45 to disengage from the reference end surface $W_s$ of workpiece W. Subsequently, the program returns to step 50 where the CPU 45 reads out a fourth data N004 from memory M to determine as to presence of the M-code at step 51. When the answer at step 51 is "No" because of no presence of the M-code, the program proceeds to step 55 where the CPU 45 determines as to presence of the G-code. In this instance, the answer is "Yes" because of presence of a code G11 in the fourth data, and the program proceeds through step 56 to step 57 where the CPU 45 determines the answer as "Yes" and causes the program to proceed to a step 62. At step 62, the CPU 45 acts to set a flag PCF for compensation of the position and to reset the flag EPF and causes the program to proceed to step 67 through steps 51 and 55. At step 67, the CPU 45 determines the answer as "Yes" and causes the program to proceed to step 70 in the flow chart of FIG. 6.

At step 70, the CPU 45 determines the answer as "No" because of no presence of the flag EPF, and the program proceeds to a step 72 where the CPU 45 determines as to presence of the flag PCF. When the answer is determined as "Yes" at step 72, the program proceeds to a step 73 where the CPU 45 acts to calculate a movement amount $\Delta Zc$ for compensation of the position of workpiece W by the following equation (1).

$$\Delta Zc = l_1 - (d_1 \tan \theta)/2 \qquad \ldots (1)$$

where the character $l_1$ is an axial distance from the reference end surface $W_s$ to a finish surface $S_b$ of a shoulder portion $W_b$ of workpiece W, and the character $d_1$ is a finish diameter of a cylindrical portion $W_a$ of workpiece W. At a step 74 of the program, the CPU 45 produces an output signal indicative of the calculated movement amount $\Delta Zc$. Responsive to the output signal from the CPU 45, the pulse generator 47Z in circuit 47 produces positive pulses corresponding in number to the calculated movement amount $\Delta Zc$ to distribute them to the drive unit 42. Thus, the drive unit 42 is activated by the positive pulses applied thereto to operate the servo motor 14 for effecting leftward movement of the work table 13, as is illustrated by solid lines in FIG. 3. As a result, the apex $G_p$ of grinding wheel G located in its original position is positioned on a path A passing through an intersection $W_p$ between the finish surface $S_a$ of cylindrical portion $W_a$ and the finish surface $S_b$ of shoulder portion $W_b$ of workpiece W. At a step 75 of the program, the original positions $X_N$ and $Z_N$ of wheel head 17 and work table 13 are respectively memorized as standard positions $X_s$ and $Z_s$ in the memory M.

Figure 4A:
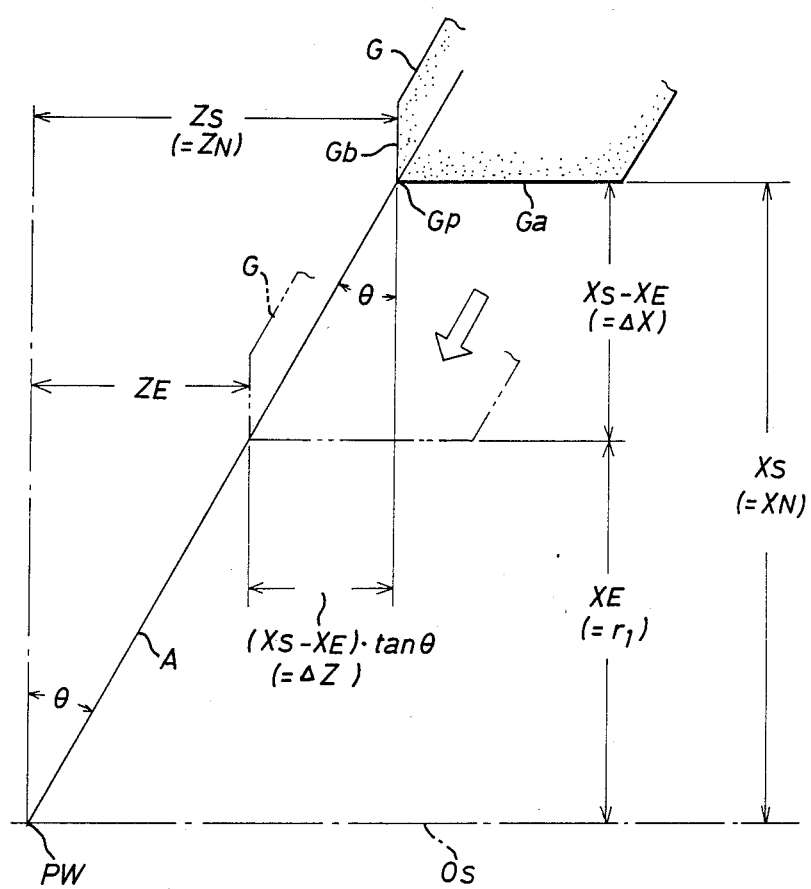
FIGS. 4 (a) and 4 (b) each illustrate a relationship between the movement amounts of the grinding wheel in X and Z-axis directions.

Subsequently, the CPU 45 reads out a fifth data N005 from memory M at step 50 of the program to determine as to presence of the M-code at step 51. In this instance, the answer is "No" because of no presence of the M-code in the fifth data, and the program proceeds to step 55 where the CPU 45 determines the answer as "Yes" because of codes G90 and G09 in the fifth data. At step 56 of the program, the CPU 45 determines the answer as "Yes" because of presence of the code G09 and causes the program to proceed to a step 61. When subsequently the program proceeds to step 59, the CPU 45 determines the answer as "Yes" because of presence of the code G90 and causes the program to proceed to a step 64. Thus, the CPU acts to set an angular feed flag AFF at step 61 and to set an absolute flag ABF at step 64. When the program proceeds to a step 76 in the flow chart of FIG. 6 after setting the flags AFF and ABF, the CPU 45 determines the answer as "Yes" because of presence of the flag AFF and causes the program to proceed to a step 78. Thus, the CPU 45 determines the answer as "Yes" and causes the program to proceed to a step 79 where a predetermined absolute position $r_1$ in the X-axis direction is set as a terminal position $X_E$ (see FIG. 4a) in an end position register (not shown). Thereafter, the program proceeds to a step 81 where the CPU 45 acts to calculate an end point $Z_E$ in the Z-axis direction based on the following equation (2).

$$Z_E = Z_S - (X_S - X_E) \tan \theta \qquad \ldots (2)$$

where $(X_S - X_E)$ represents a movement amount of the first grinding surface Ga from the original position in the X-axis direction as indicated by the solid line in FIG. 4a, $(X_S - X_E) \tan \theta$ represents a movement amount of the second grinding surface $G_b$ from the original position in the Z-axis direction as indicated by the solid line in FIG. 4a, and the Z-axis end point $Z_E$ is determined in relation to an intersection $P_W$ of the path A and the main shaft axis $O_s$. At a step 82 of the program, the CPU 45 calculates a deviation $\Delta X$ between the values $X_N$ and $X_E$ and a deviation $\Delta Z$ between the values $Z_N$ and $Z_E$, and subsequently the program proceeds to a step 83 where the CPU 45 produces output signals respectively indicative of the deviations $\Delta X$ and $\Delta Z$. Responsive to the output signals from the CPU 45, both the pulse generators 47X and 47Z in circuit 47 produce positive pulses corresponding in number to the respective deviations $\Delta X$ and $\Delta Z$ to simultaneously distribute them to the drive units 41 and 42. Thus, the servo motors 18 and 14 are activated to effect relative movement between the work table 13 and the wheel head 17, whereby the grinding wheel G is moved along the path A from the original position indicated by the solid line in FIG. 4 (a) to a rapid feed end position indicated by the phantom line at a rapid feed rate designated by feed rate data ($F_1$).

Figure 4B:
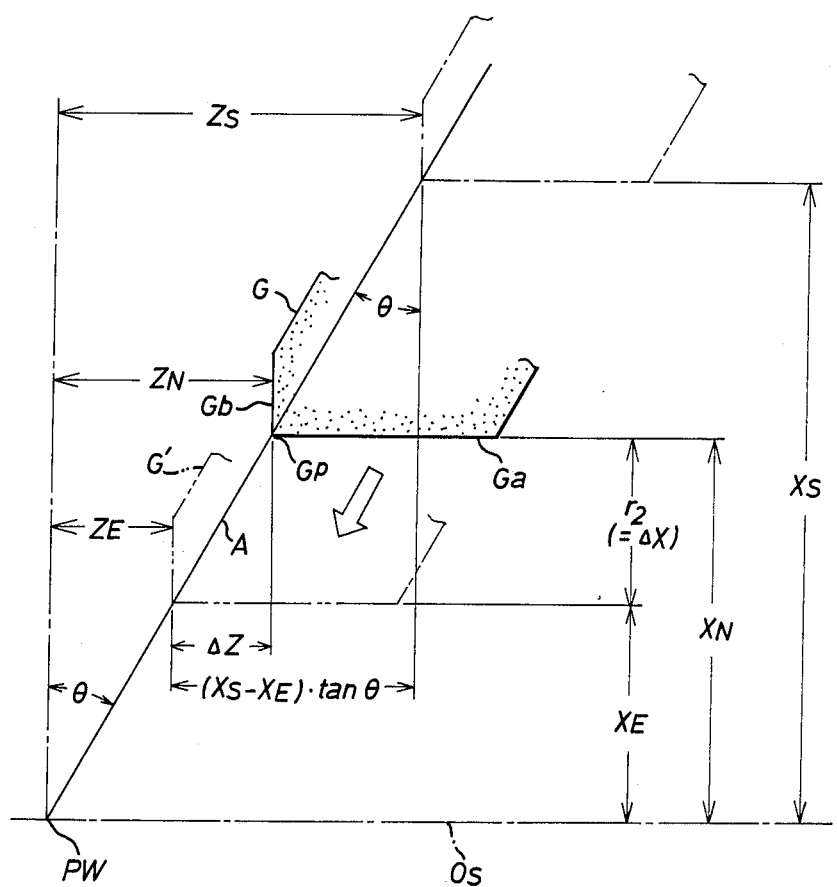

When the sixth data N006 is read out at step 50, the grinding wheel G is advanced from the rapid feed end position indicated by the solid line in FIG. 4 (b) to a grinding feed end position indicated by the symbol G'. That is, the absolute flag ABF is reset at a step 65 during the execution of the sixth data N006, and the CPU 45 determines the answer as "No" at step 78 and causes the program to a step 80. In this instance, an incremental movement amount $r_2$ in the X-axis direction is subtracted from the advanced position $X_N$ of the first grinding surface $G_a$, and the subtracted value is set as the terminal value $X_E$ in the end position register. Thereafter, the program proceeds to the step 81 where the CPU acts to calculate the end point $Z_E$ in the X-axis direction based on the equation (2) described above. Subsequently, at step 82 of the program, the CPU 45 calculates a deviation $\Delta X$ between the values $X_N$ and $Z_E$ and a deviation $\Delta Z$ between the values $Z_N$ and $Z_E$ to produce output signals respectively indicative of the deviations $\Delta X$ and $\Delta Z$ at step 83 of the program. As a result, both the pulse generators 47X and 47Z are responsive to the output signals of the CPU 45 to produce positive pulses corresponding in number to the respective deviations $\Delta X$ and $\Delta Z$ to simultaneously distribute them to the drive units 41 and 42, and in turn, the servo motors 18 and 14 are activated to effect further relative movement between the work table 13 and the wheel head 17 thereby to move the grinding wheel G along the path A. Consequently, the apex portion $G_p$ of grinding wheel G is advanced to the intersection $W_p$ such that the cylindrical and shoulder portions $W_a$ and $W_b$ of workpiece W are simultaneously ground and finished by the first and second grinding surfaces $G_a$ and $G_b$ of wheel G.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. A numerically controlled grinding machine including a bed, a work table slidably mounted on said bed in a first axis direction for supporting thereon a workpiece and rotating it about the first axis, a wheel head slidably mounted on said bed in a second axis direction perpendicular to the first axis, a grinding wheel rotatably mounted on said wheel head and having a first grinding surface arranged in parallel with the first axis for grinding a cylindrical portion of said workpiece and a second grinding surface arranged in parallel with the second axis for grinding a shoulder portion of said workpiece adjacent to the cylindrical portion, first and second feed mechanisms for moving said work table and said wheel head respectively in the first and second axis directions, and a numerical control apparatus for activating both said feed mechanisms on a basis of numerical control data and for effecting simultaneous movements of said work table and said wheel head to move said grinding wheel along a path extending across the first axis at an acute angle, wherein said numerical control apparatus comprises:
memory means for storing said numerical control data, an instruction for effecting the simultaneous movements of said work table and said wheel head, and command data indicative of a movement amount of said wheel head in the second axis direction;
means for reading out the stored instruction and command data;
computation means responsive to the read out instruction for calculating a movement amount of said work table in the first axis direction on a basis of the read out command data so as to enable said grinding wheel to move along said path and for producing first and second output signals respectively indicative of the movement amount of said wheel head and the calculated movement amount of said work table; and means responsive to the output signals of said computation means for activating said feed mechanisms to effect the simultaneous movements of said work table and said wheel head.

2. A numerically controlled grinding machine as recited in claim 1, wherein said command data includes an absolute position $r_1$ of said wheel head in the second axis direction for advance of the first grinding surface of said wheel toward the cylindrical portion of said workpiece, and wherein said computation means is arranged to set the absolute position $r_1$ as a value $X_E$, to calculate an end point $Z_E$ on a basis of an equation, $Z_E = Z_S - (X_S - X_E) \tan \theta$ where $Z_S$ is an original position of the second grinding surface of said wheel, $X_S$ is an original position of the first grinding surface of said wheel, and $\theta$ is an acute angle between the path and the second axis, to determine a deviation $\Delta X$ between the values $X_S$ and $X_E$ and a deviation $\Delta Z$ between the values $Z_S$ and $Z_E$, and to produce the first and second output signals respectively indicative of the deviations $\Delta X$ and $\Delta Z$.

3. A numerically controlled grinding machine as recited in claim 1, wherein said command data includes an incremental movement amount $r_2$ of said wheel head in the second axis direction for advance of the first grinding surface of said wheel toward the cylindrical portion of said workpiece, and wherein said computation means is arranged to subtract the incremental movement amount $r_2$ from a feed start position $(X_N)$ of the first grinding surface of said wheel, to set the subtracted value as a value $X_E$, to calculate an end point $Z_E$ on a basis of an equation, $Z_E = Z_S - (X_S - X_E) \tan \theta$ where $Z_S$ is an original position of the second grinding surface of said wheel, $X_S$ is an original position of the first grinding surface of said wheel, and $\theta$ is an acute angle between the path and the second axis, to determine a deviation $\Delta X$ between the values $X_N$ and $X_E$ and a deviation $\Delta Z$ between the value $Z_E$ and a value $Z_N$ indicative of a feed start position of the second grinding surface of said wheel, and to produce the first and second output signals respectively indicative of the deviations $\Delta X$ and $\Delta Z$.

4. A numerically controlled grinding machine as recited in claim 1, wherein the original position of said grinding wheel is spaced in a predetermined distance from the rotation axis of said workpiece in the second axis direction and spaced in a predetermined distance from an intersection of the path and the rotation axis of said workpiece in the first axis direction, and wherein said computation means is arranged to calculate a movement amount of said work table in the first axis direction with reference to data indicative of the original position of said grinding wheel.

5. A numerically controlled grinding machine as recited in claim 4, wherein said command data is represented by one of an absolute value and an incremental value, and wherein said computation means is further arranged to subtract said command data from a position of said grinding wheel in the second axis direction when the incremental value represents said command data and calculate a feed end position of said grinding wheel based on the subtracted value.

* * * * *